(12) United States Patent
Yoshida et al.

(10) Patent No.: US 8,570,548 B2
(45) Date of Patent: Oct. 29, 2013

(54) IMAGE FORMING APPARATUS AND ACCESS CONTROL METHOD BETWEEN AN IMAGE FORMING APPARATUS AND A DEVICE EXTERNAL TO THE IMAGE FORMING APPARATUS

(75) Inventors: Hiroki Yoshida, Takatsuki (JP); Chiho Murai, Yao (JP)

(73) Assignee: Konica Minolta Holdings, Inc., Tokyo (JP)

( * ) Notice: Subject to any disclaimer, the term of this patent is extended or adjusted under 35 U.S.C. 154(b) by 167 days.

(21) Appl. No.: 12/997,724

(22) PCT Filed: Apr. 22, 2009

(86) PCT No.: PCT/JP2009/058015
§ 371 (c)(1),
(2), (4) Date: Dec. 13, 2010

(87) PCT Pub. No.: WO2009/154040
PCT Pub. Date: Dec. 23, 2009

(65) Prior Publication Data
US 2011/0096352 A1    Apr. 28, 2011

(30) Foreign Application Priority Data
Jun. 16, 2008  (JP) ................................ 2008-156893

(51) Int. Cl.
*G06K 15/00*     (2006.01)
(52) U.S. Cl.
USPC ...................................................... 358/1.14
(58) Field of Classification Search
None
See application file for complete search history.

(56) References Cited

U.S. PATENT DOCUMENTS

| 2002/0131784 A1 | 9/2002 | Takemoto |
| 2005/0163514 A1* | 7/2005 | Hwang ............................ 399/8 |
| 2005/0225792 A1* | 10/2005 | Morita ........................ 358/1.14 |
| 2006/0188270 A1* | 8/2006 | Chen .............................. 399/12 |

FOREIGN PATENT DOCUMENTS

| JP | 2002-278379 | 9/2002 |
| JP | 2005-178179 | 7/2005 |
| JP | 2005-267405 | 9/2005 |
| JP | 2008-015548 | 1/2008 |

OTHER PUBLICATIONS

International Search Report regarding PCT Patent Application No. PCT/JP2009/058015, mailed Jul. 21, 2009, one page.
International Search Report in International Application No. PCT/AU2009/058015, mailed Jul. 21, 2009, 1 page.

* cited by examiner

*Primary Examiner* — Jeremiah Bryar
(74) *Attorney, Agent, or Firm* — Brinks Hofer Gilson & Lione

(57) ABSTRACT

A manufacturer or the like provides consumable products used in an image forming apparatus with distribution information including a most recent license code and then markets the consumable products, and the image forming apparatus performs authentication processing by reading the distribution information from such consumable products. Receiving a connection request from an application executed by a personal computer, the image forming apparatus determines whether connection may be permitted or not by comparing the license code of the application included in the connection request with the distribution information provided to the consumable product.

13 Claims, 14 Drawing Sheets

156a(156b)

| No. | LICENSE CODE | APPLICATION | DATE OF REGISTRATION |
|---|---|---|---|
| 1 | 848ddd02-4a92-11da-a86b-5f4c40b81801 | App.01 version1 | 2008/2/2 |
| 2 | 848ddd02-4a92-11da-a86b-5f4c40b81802 | App.02 version1 | 2008/2/1 |
| 3 | 848ddd02-4a92-11da-a86b-5f4c40b81803 | App.04 version0.9 | 2007/6/20 |
| ... | ... | ... | ... |

READ SIGNAL/WRITE SIGNAL (A)

(B)

(C)

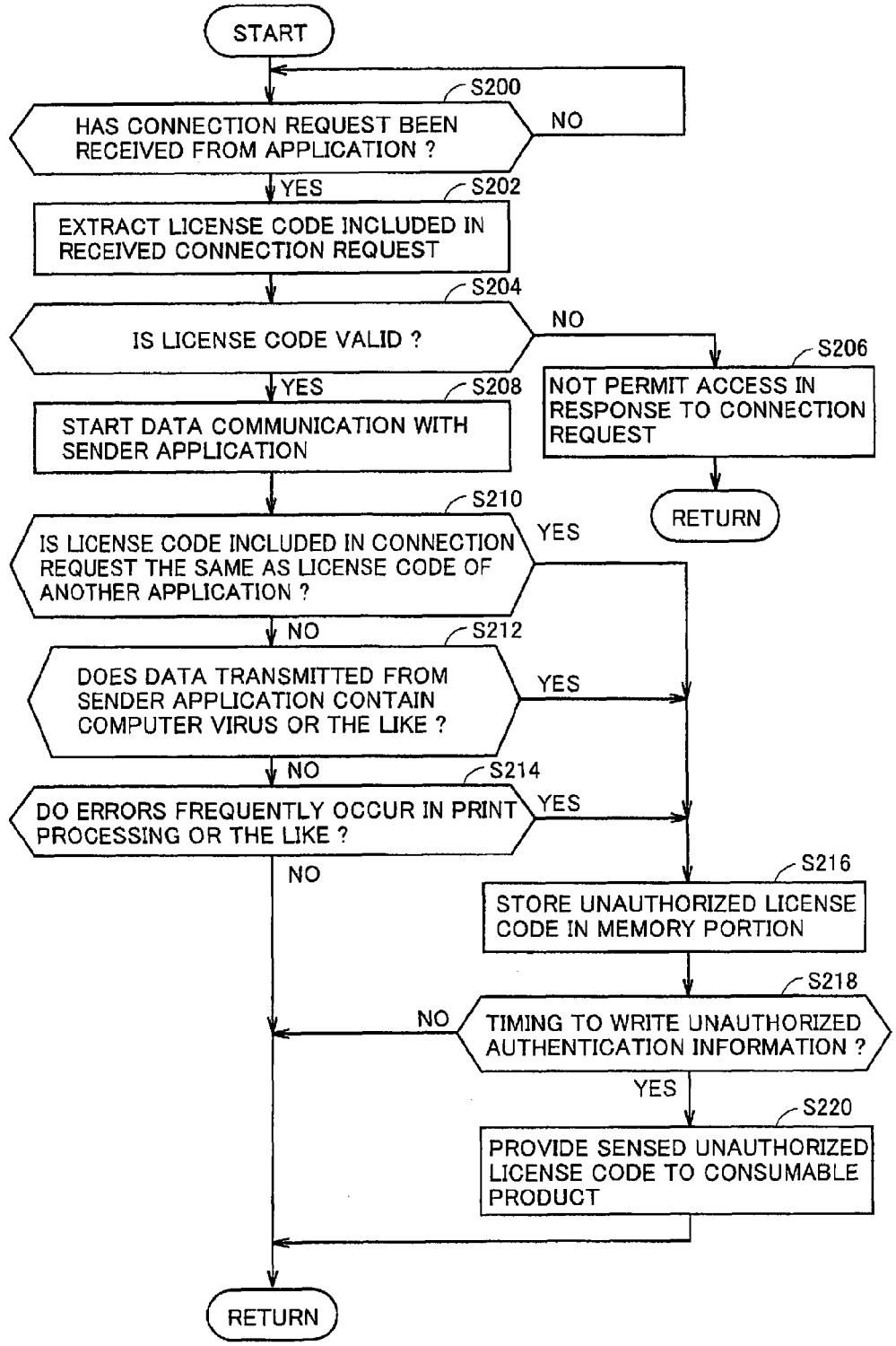

IMAGE FORMING APPARATUS AND ACCESS CONTROL METHOD BETWEEN AN IMAGE FORMING APPARATUS AND A DEVICE EXTERNAL TO THE IMAGE FORMING APPARATUS

This application is a National Stage application of International Application No. PCT/JP2009/058015, filed Apr. 22, 2009.

TECHNICAL FIELD

The present invention relates to an image forming apparatus and an access control method in the image forming apparatus, and particularly to a configuration capable of appropriately controlling access even in an environment in which connection to an external network is restricted.

BACKGROUND ART

With the development of digital techniques, network techniques and the like in recent years, such image forming apparatuses as a multiple function peripheral (MFP) and a printer have also been networked. Such image forming apparatuses are networked with a personal computer and the like through LAN (Local Area Network) and perform image forming processing in response to a print command or the like received from the personal computer (or an application executed on the personal computer).

Since the image forming apparatus networked as such is accessed by various apparatuses, security measures are generally taken from a viewpoint of prevention of frauds or abnormal processing. Such a method as allocating specific authentication information (hereinafter also referred to as a "license code") in advance to an application approved by a manufacturer or the like of an image forming apparatus and giving permission of data communication with the image forming apparatus only to an application transmitting such an authorized license code has been known as one of such security measures. Namely, an image forming apparatus accessed by any application determines whether to receive a license code transmitted from that application or not and further determines whether the received license code is unauthorized or not. Then, only when the image forming apparatus received an authorized license code, the image forming apparatus permits access from the application. Such a license code is updated at any time, in accordance with updating of the application or expiration thereof. Therefore, in order to effectively cause such security measures to function, the manufacturer or the like of the image forming apparatus should timely distribute the updated license code.

Meanwhile, Japanese Laid-Open Patent Publication No. 2005-267405 (Patent Document 1) proposes a method of determining authenticity of an application installed in a networked image forming apparatus or the like.

PRIOR ART DOCUMENTS

Patent Documents
Patent Document 1: Japanese Laid-Open Patent Publication No. 2005-267405

SUMMARY OF THE INVENTION

Problems to be Solved by the Invention

In view of such circumstances that an unauthorized access method is more sophisticated, a configuration in which a local network including an image forming apparatus and a global network such as the Internet are separate from each other is adopted in many cases. In such a network environment, though data communication between an image forming apparatus and a personal computer connected to the same local network is not restricted, access from the image forming apparatus to an external server or the like is restricted. Therefore, even when security measures as described above are to be taken, access to a server installed on the manufacturer side cannot be made and a license code cannot automatically be updated to a most recent one.

Meanwhile, it is also possible that a user of the image forming apparatus obtains an updated license code with some method and sets (installs) the license code in the image forming apparatus, however, it is a very bothersome operation for the user.

In addition, the method disclosed in Japanese Laid-Open Patent Publication No. 2005-267405 (Patent Document 1) is based on the premise that access to an external server is permitted, and it does not solve the problem as described above.

From the foregoing, the present invention was made to solve such problems, and an object of the present invention is to provide an image forming apparatus capable of appropriately control access to the image forming apparatus without imposing excessive load on a user and an access control method in the image forming apparatus.

Means for Solving the Problems

An image forming apparatus according to one aspect of the present invention includes a communication portion for communicating data, a storage portion for storing first reference information including at least one of identification information indicating prohibition of access and identification information indicating permission of access, an authentication portion for determining, when a connection request including sender identification information is received, whether access in response to the connection request is permitted or not, by comparing the identification information with the first reference information, and a reading portion for reading second reference information from a consumable product involved with image forming, to which the second reference information including at least one of identification information indicating prohibition of access and identification information indicating permission of access has been provided, and updating the first reference information stored in the storage portion based on the second reference information.

Preferably, the reading portion updates the first reference information stored in the storage portion when the second reference information read from the consumable product is newer than the first reference information stored in the storage portion.

Preferably, the consumable product includes at least one of a toner unit and an imaging unit.

Preferably, the reading portion includes a sensor for reading the second reference information with any method of electrical, magnetic and optical methods when the consumable product is attached.

Preferably, the consumable product is provided with an IC chip or an IC tag storing the second reference information.

Preferably, the second reference information provided to the consumable product is encrypted, and the reading portion decrypts the second reference information read from the consumable product.

Preferably, the image forming apparatus further includes a sensing portion for determining whether a sender from which access was permitted is qualified or not, and sensing identification information included in a connection request from that sender as unauthorized identification information when the sender is not qualified, and a providing portion for providing the unauthorized identification information sensed by the sensing portion to the consumable product.

Further preferably, the providing portion writes the unauthorized identification information in a storage medium storing the second reference information.

According to another aspect of the present invention, an access control method in an image forming apparatus capable of communicating data is provided. The access control method includes the steps of storing first reference information including at least one of identification information indicating prohibition of access and identification information indicating permission of access, determining, when a connection request including sender identification information is received, whether access in response to the connection request is permitted or not, by comparing the identification information with the first reference information, and reading second reference information from a consumable product involved with image forming, to which the second reference information including at least one of identification information indicating prohibition of access and identification information indicating permission of access has been provided, and updating the first reference information stored in a storage portion based on the second reference information.

Effects of the Invention

According to the present invention, access to an image forming apparatus can appropriately be controlled, without imposing excessive load on a user.

BRIEF DESCRIPTION OF THE DRAWINGS

FIG. 16 is a flowchart showing a series of processing procedures in a system according to the second embodiment of the present invention.

MODES FOR CARRYING OUT THE INVENTION

Figure 1:
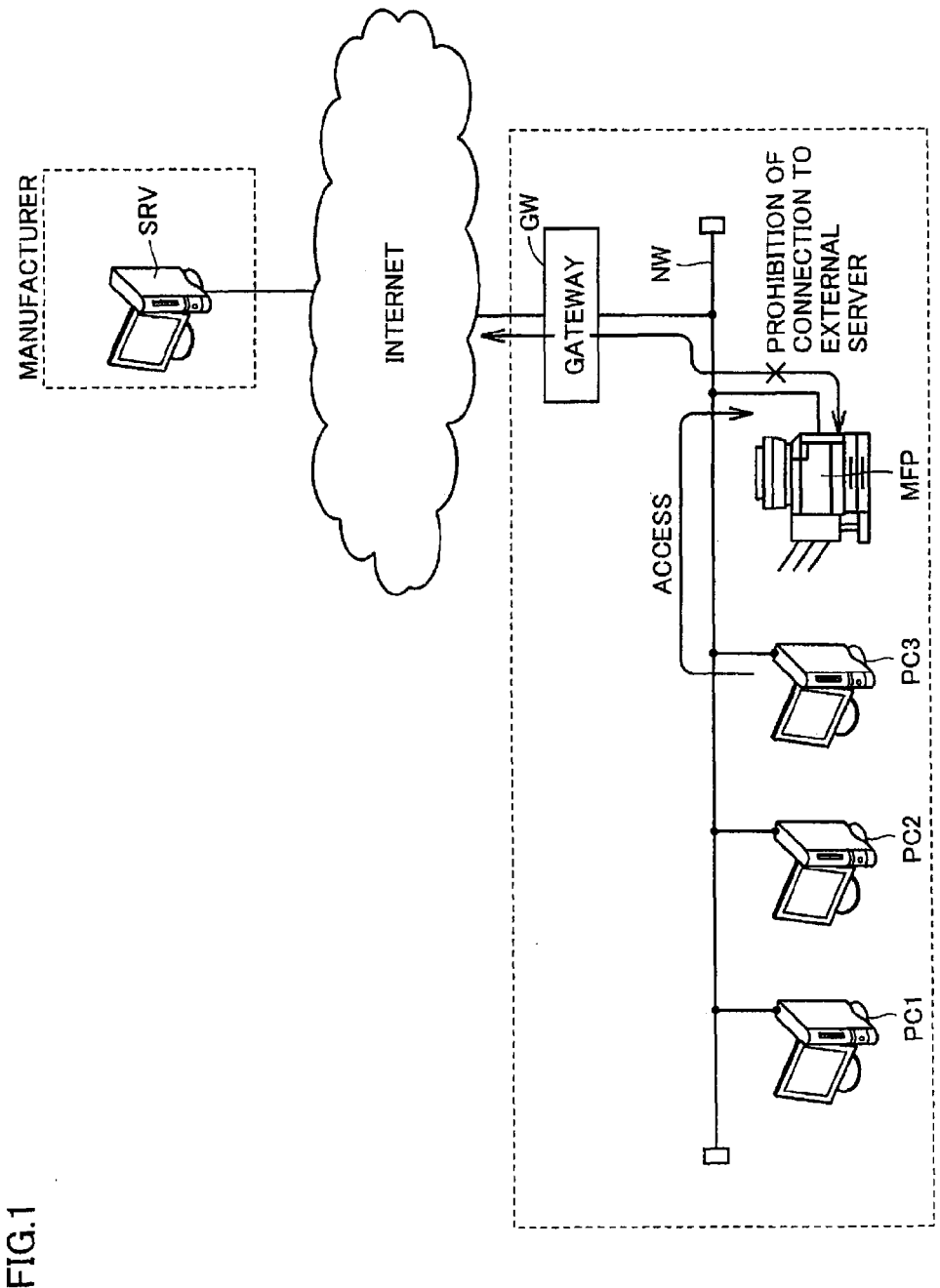
FIG. 1 is a schematic configuration diagram showing an exemplary system configuration according to a first embodiment of the present invention.

An embodiment of the present invention will be described in detail with reference to the drawings. In the drawings, the same or corresponding elements have the same reference characters allotted and description thereof will not be repeated.

In the embodiment below, a multiple function peripheral incorporating a plurality of functions such as a FAX transmission function and an image reading function in addition to an image forming function such as copying or printing will be described as a representative example of an image forming apparatus according to the present invention,

[First Embodiment]

(Overall Configuration of Network System)

FIG. 1 is a schematic configuration diagram showing an exemplary system configuration according to a first embodiment of the present invention.

Referring to FIG. 1, for example, a form in which an image forming apparatus MFP capable of communicating data and a plurality of personal computers PC1 to PC3 (hereinafter also collectively referred to as "personal computer PC") are connected to a local network NW such as an in-house network is considered as a system according to the present embodiment.

It is assumed that personal computer PC executes various applications including an operating system (OS). Among these applications, an application for communicating data sends a print command to image forming apparatus MFP or obtains a file stored in image forming apparatus MFP, in response to a user's instruction. More specifically, when a user's print operation is performed on a word-processing application or a spreadsheet application, such an application as a printer driver generates a print command based on information from those applications and sends the command to image forming apparatus MFP. In addition, such an application as a file management program causes display of a list of files such as image data stored in image forming apparatus MFP or causes a designated file to be obtained, in response to a user's operation.

Receiving access from personal computer PC as described above, image forming apparatus MFP requests specific authentication information (hereinafter also referred to as a "license code") to an application from which access was made. Then, only when a license code of the application from which access was made is determined as authorized, image forming apparatus MFP permits access.

It is noted that the "authentication information" or the "license code" herein collectively refers to information used for authentication for establishing logical connection between image forming apparatus MFP and another apparatus (such as a personal computer). For the "authentication information" or the "license code", a code (value) unique to a device (hardware) or an application (program) from which connection is made is employed. More specifically, a case where a specific code is allocated to an application approved by a manufacturer or the like of image forming apparatus MFP or a case where a code obtained by combining a name of an application, a version number, a patch number that has already been applied, and the like is employed are assumed. In the embodiment shown below, it is assumed that a specific license code is allocated in advance to each application.

Local network NW is connected to the Internet, which is the external network, through a gateway GW. From a point of view of security, however, it is assumed that gateway GW prohibits (restricts) access from image forming apparatus MFP to an external server.

In such an environment, image forming apparatus MFP cannot access a server SRV of the manufacturer (or a sales company) of image forming apparatus MFP that is present on the Internet. A configuration for updating reference information for determining whether a license code is valid or not in such a network environment will be described below.

(Method of Distributing License Code)

Figure 2:
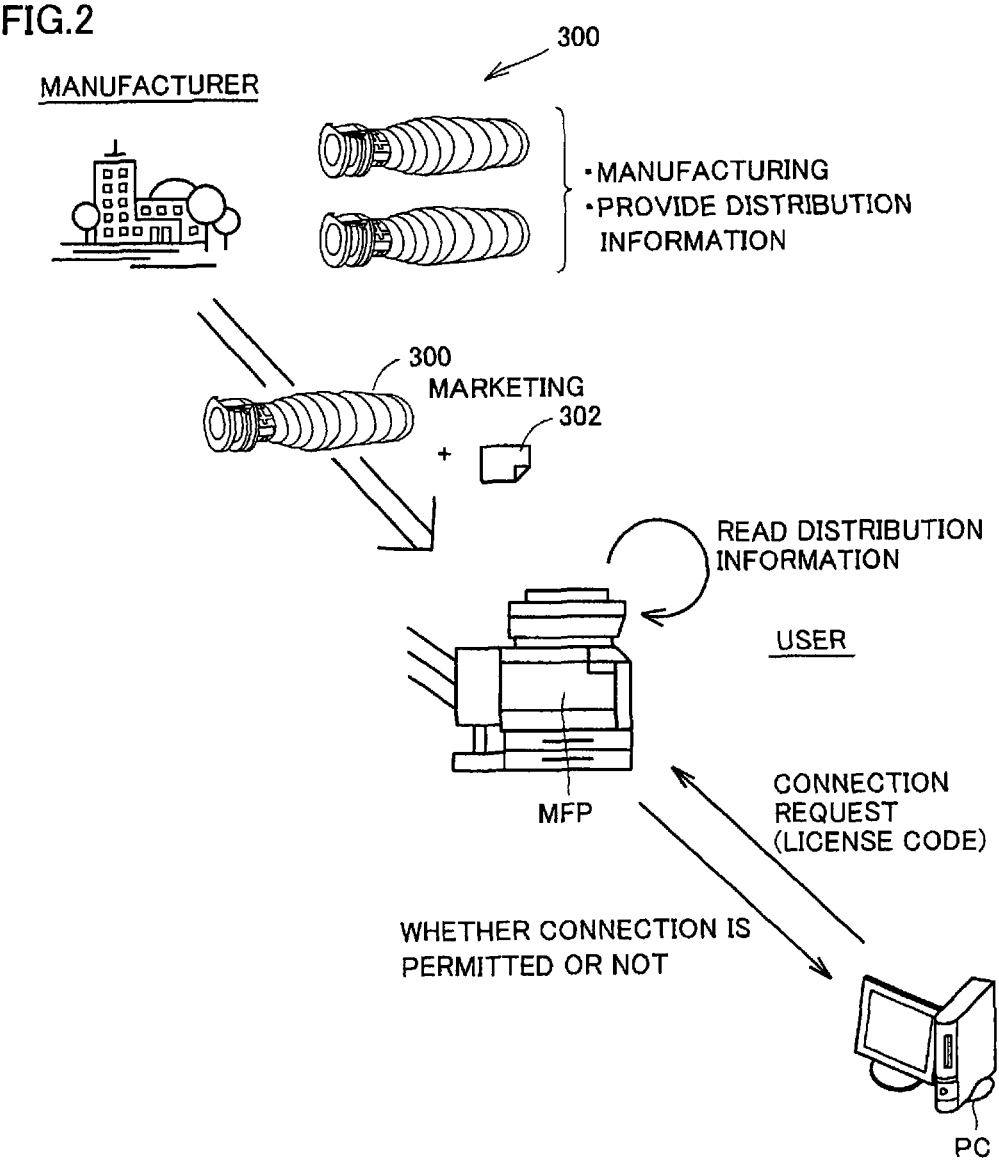
FIG. 2 is a schematic diagram for illustrating a method of distributing a license code according to the first embodiment of the present invention.

FIG. 2 is a schematic diagram for illustrating a method of distributing a license code according to the first embodiment of the present invention.

Referring to FIG. 2, in the present embodiment, a manufacturer or the like provides consumable products 300 used in image forming apparatus MFP with distribution information 302 including a most recent license code and then markets consumable products 300, and image forming apparatus MFP performs authentication processing by reading the distribution information from such a consumable product. Namely, receiving a connection request from an application executed on personal computer PC, image forming apparatus MFP determines whether connection is permitted or not, by comparing the license code of the application included in the connection request with the distribution information provided to the consumable product. This distribution information includes reference information consisting at least one of a license code indicating prohibition of access and a license code indicating permission of access.

Possible examples of the consumable products include a toner unit, an imaging unit, recording paper, a prepaid card, and the like, however, in the description below, a manner of providing the toner unit with distribution information 302 will mainly be exemplified.

Distribution information 302 can include a black list in which a license code for specifying a party from which access should be prohibited is described and a white list in which a license code for specifying a party from which access can be permitted is described. When the black list is used, an application not registered in the black list is determined as valid. When the white list is used, only an application registered in the white list is determined as valid. In other words, an "unauthorized license code" herein can broadly encompass a license code registered in the black list and a license code not registered in the white list.

The consumable product as described above is inevitably replaced as image forming apparatus MFP is used. Therefore, by adopting the distribution method as described above, information on the unauthorized license code used for authentication can readily be updated even in image forming apparatus MFP of which connection to an external network is restricted. Consequently, access to image forming apparatus MFP can appropriately be controlled.

(Configuration of Image Forming Apparatus)

Figure 3:
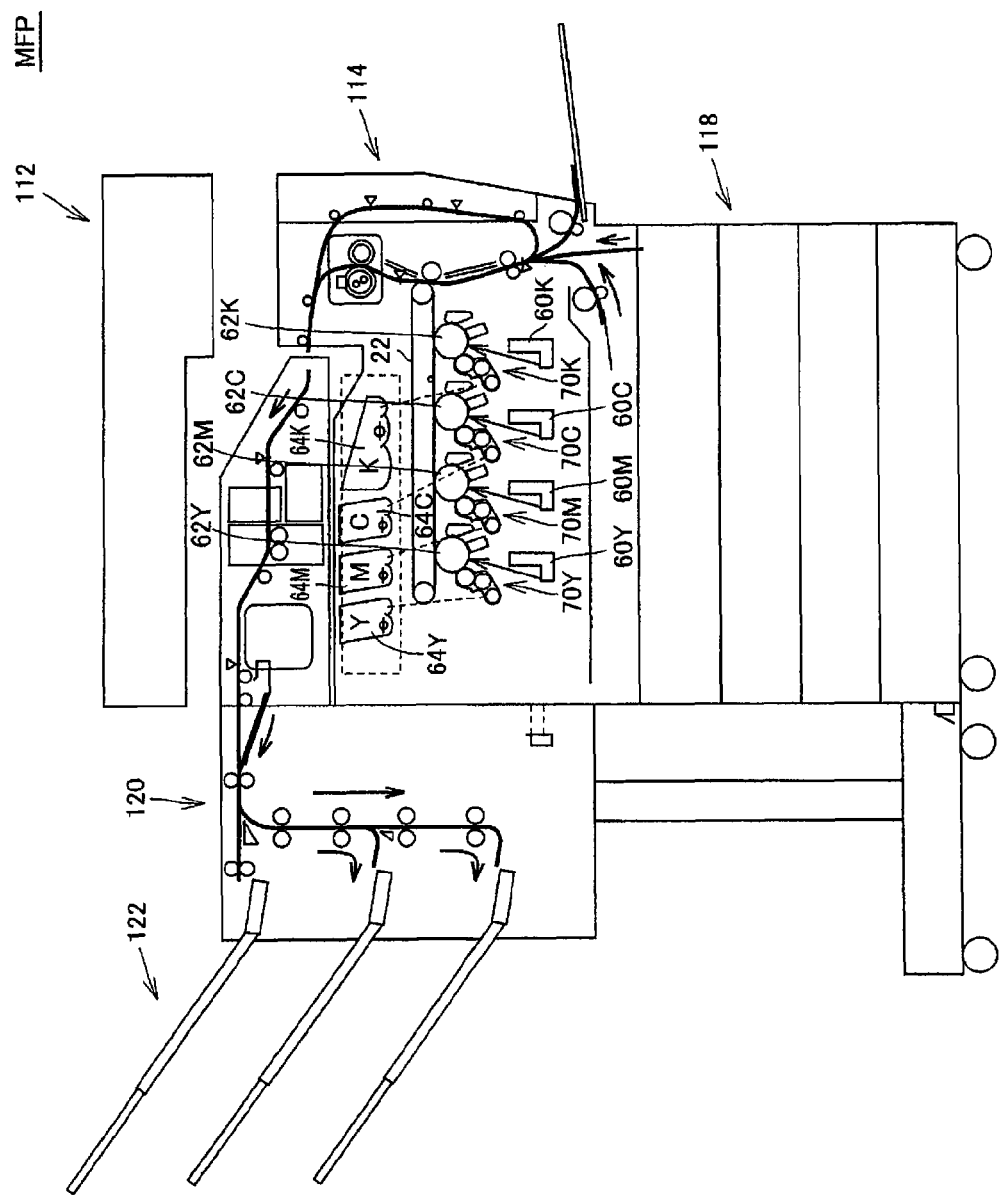
FIG. 3 is a cross-sectional view showing overview of an apparatus configuration of an image forming apparatus according to the first embodiment of the present invention.

FIG. 3 is a cross-sectional view showing overview of an apparatus configuration of image forming apparatus MFP according to the first embodiment of the present invention.

Referring to FIG. 3, image forming apparatus MFP includes a scanner 112, a print engine 114, a paper feed portion 118, a paper ejection apparatus 120, and a paper ejection tray 122.

Scanner 112 reads image information from a document and generates image data. This image data is sent to print engine 114 for print processing or transmission as FAX data. More specifically, scanner 112 causes a light source to emit light toward the document placed on a platen glass and causes an image pick-up device or the like to receive light reflected from the document, to thereby read image information of the document. Alternatively, scanner 112 may be structured to include a document feed tray, a delivery roller, a resist roller, a carrier drum, a paper ejection tray, and the like, such that documents can continuously be read.

Print engine 114 prints image data read by scanner 112 or image data received by a network I/F portion 106 (FIG. 4) or the like which will be described later on a sheet of recording paper. Representatively, print engine 114 includes an electrophotographic color image formation unit. More specifically, print engine 114 includes imaging units 70Y, 70M, 70C, 70K (hereinafter also collectively referred to as "imaging unit 70") for generating a toner image of each color of yellow (Y), magenta (M), cyan (C), and black (K). Imaging units 70Y, 70M, 70C, 70K are arranged in this order, along a transfer belt 22 cyclically driven within print engine 114.

Imaging units 70Y, 70M, 70C, 70K include light-exposure scanning portions 60Y, 60M, 60C, 60K (hereinafter also collectively referred to as "light-exposure scanning portion 60") and photoconductor drums 62Y, 62M, 62C, 62K (hereinafter also collectively referred to as "photoconductor drum 62"), respectively. Each light-exposure scanning portion 60 includes a laser diode emitting laser beams in accordance with an image of each color included in image data of interest and a polygon mirror for exposing a surface of corresponding photoconductor drum 62 to light in a direction of main scanning by polarizing these laser beams.

On the respective surfaces of photoconductor drums 62Y, 62M, 62C, 62K, electrostatic latent images are formed as a result of exposure by light-exposure scanning portion 60 as described above, and these electrostatic latent images are developed as toner images by toner particles supplied from corresponding toner units 64Y, 64M, 64C, 64K (hereinafter also collectively referred to as "toner unit 64"), respectively.

The toner image of each color developed on the surface of each photoconductor drum 62 is successively transferred to transfer belt 22. In addition, the toner images superimposed on this transfer belt 22 are further transferred onto a sheet of recording paper timely supplied from paper feed portion 118.

The toner images transferred onto this sheet of recording paper are fixed by a fixing portion arranged downstream and thereafter the paper is ejected onto appropriate paper ejection tray 122 through paper ejection apparatus 120.

In the apparatus configuration described above, imaging unit 70, toner unit 64, recording paper, and the like fall under the consumable products. In particular, in imaging unit 70, photoconductor drum 62 deteriorates as it is used, and in toner unit 64, toner particles stored therein are consumed as they are used.

Figure 4:
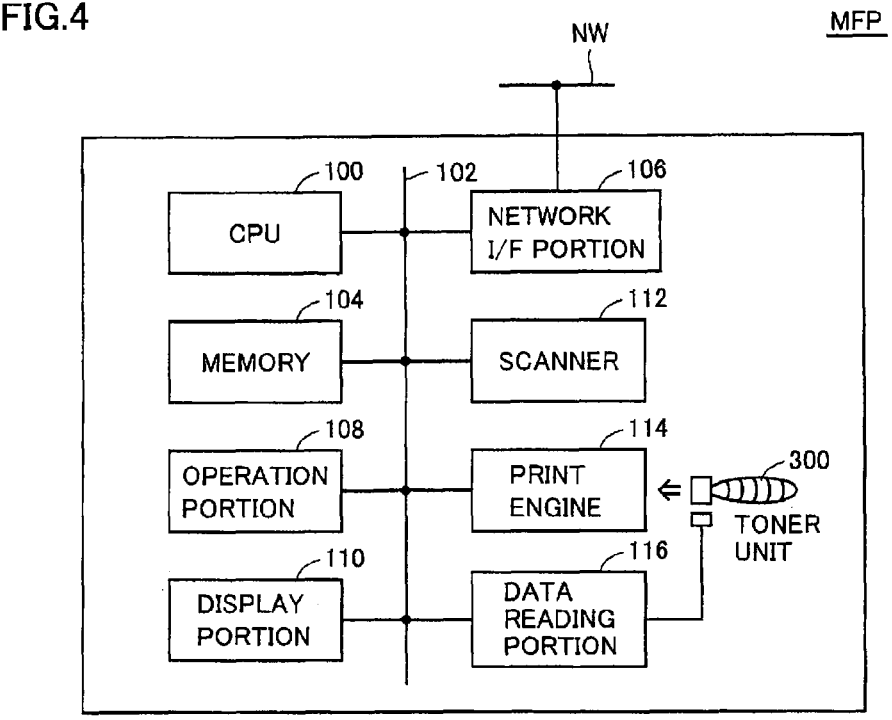
FIG. 4 is a block diagram showing a functional configuration of the image forming apparatus according to the first embodiment of the present invention.

FIG. 4 is a block diagram showing a functional configuration of image forming apparatus MFP according to the first embodiment of the present invention.

Referring to FIG. 4, image forming apparatus MFP includes a CPU (Central Processing Unit) 100, a memory 104, network interface (I/F) portion 106, an operation portion 108, a display portion 110, scanner 112, print engine 114, and a data reading portion 116, and these portions are connected to one another through a bus 102 so that data can be communicated thereamong.

CPU 100 is a processor responsible for overall control of image forming apparatus MFP and provides each processing according to the present embodiment by executing a program stored in advance in memory 104 or the like.

Memory 104 is configured to representatively include a volatile memory such as a DRAM (Dynamic Random Access Memory) and a non-volatile memory such as a flash memory. More specifically, memory 104 temporarily stores image data of a document read by scanner 112 and stores a program to be executed by CPU 100.

Operation portion 108 serves as an input portion for accepting a user's instruction and includes various keys and a touch panel.

Display portion 110 serves as an information presentation portion for presenting various types of information to the user and includes a liquid crystal panel or an LED (Light Emitting Diode) indicator.

Network I/F portion 106 transmits and receives a signal for communicating data between personal computer PC and another image forming apparatus MFP through local network NW.

Since scanner 112 and print engine 114 have been described above, detailed description will not be repeated.

Data reading portion 116 reads distribution information provided to the consumable product (representatively, a toner unit) and causes memory 104 to store the read distribution information. As will be described later, since the consumable product is provided with the distribution information with various methods such as electrical, magnetic and optical methods, data reading portion 116 is implemented by a sensor capable of reading data electrically, magnetically or optically, depending on a form of the distribution information provided to the consumable product.

(Configuration of Personal Computer)

Figure 5:
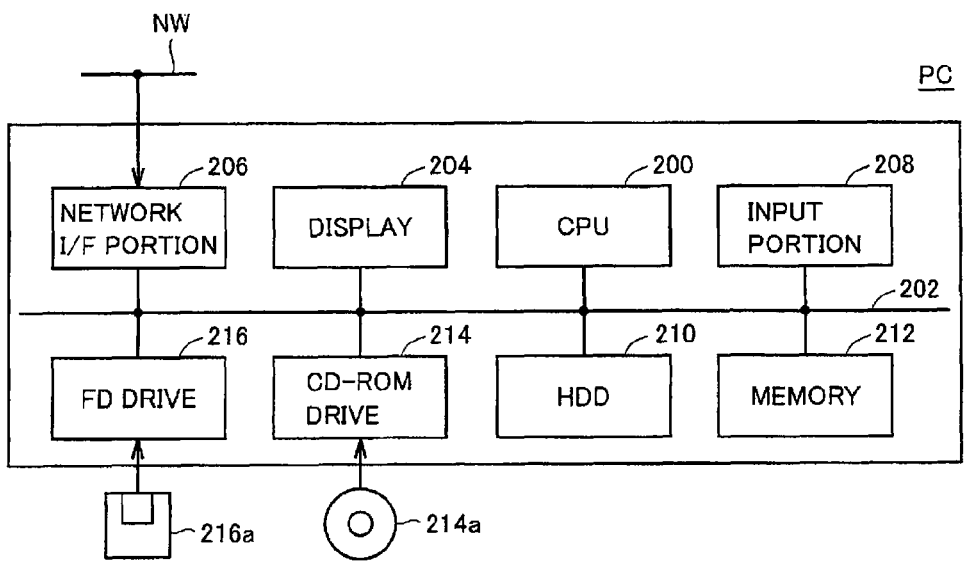
FIG. 5 is a block diagram showing a functional configuration of a personal computer according to the first embodiment of the present invention.

FIG. 5 is a block diagram showing a functional configuration of personal computer PC according to the first embodiment of the present invention.

Referring to FIG. 5, personal computer PC includes a CPU 200 for executing various programs including an operating system, a memory 212 for temporarily storing data necessary for execution of a program by CPU 200, and a hard disk drive (HDD) 210 for storing a program executed by CPU 200 in a non-volatile manner. Such a program is read from a CD-ROM (Compact Disk-Read Only Memory) 214a, a flexible disk (FD) 216a, or the like by a CD-ROM drive 214 or a flexible disk drive 216.

CPU 200 receives a user's operation request through an input portion 208 implemented by a keyboard, a mouse or the like and outputs screen output generated as a result of execution of a program to a display 204. In addition, CPU 200 communicates data with image forming apparatus MFP through a network interface (I/F) portion 206 implemented by a LAN card or the like. These portions are connected to one another through a bus 202 such that data can be communicated thereamong.

Figure 6:
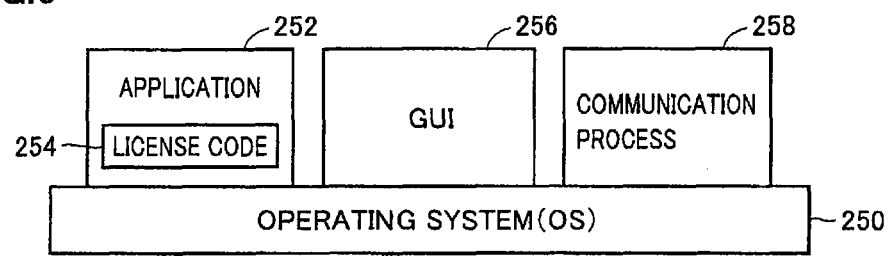
FIG. 6 is a schematic diagram showing an exemplary configuration of a program executed on the personal computer according to the first embodiment of the present invention.

FIG. 6 is a schematic diagram showing an exemplary configuration of a program executed on personal computer PC according to the first embodiment of the present invention.

Referring to FIG. 6, in personal computer PC, an operating system (OS) 250 for performing basic processing is executed, and by utilizing a partial function of this operating system, such a program as an application 252, a GUI (Graphical User Interface) 256, and a communication process 258 is executed.

Application 252 according to the present embodiment includes a license code 254 allocated in advance by the manufacturer of image forming apparatus MFP, and when connection to image forming apparatus MFP is established, a connection request including this license code 254 is transmitted.

GUI 256 causes display 204 to display a visual interface for displaying various types of information and accepting a user's instruction. Namely, as the user performs an operation with reference to display 204, a corresponding internal command is transmitted to application 252 through this GUI 256 and processing by application 252 is performed. In addition, a result of execution of application 252 is transmitted to GUI 256 and displayed on display 204.

Communication process 258 performs processing for communication with image forming apparatus MFP in response to an internal command from application 252 or the like.

(Control Structure of Image Forming Apparatus)

Figure 7:
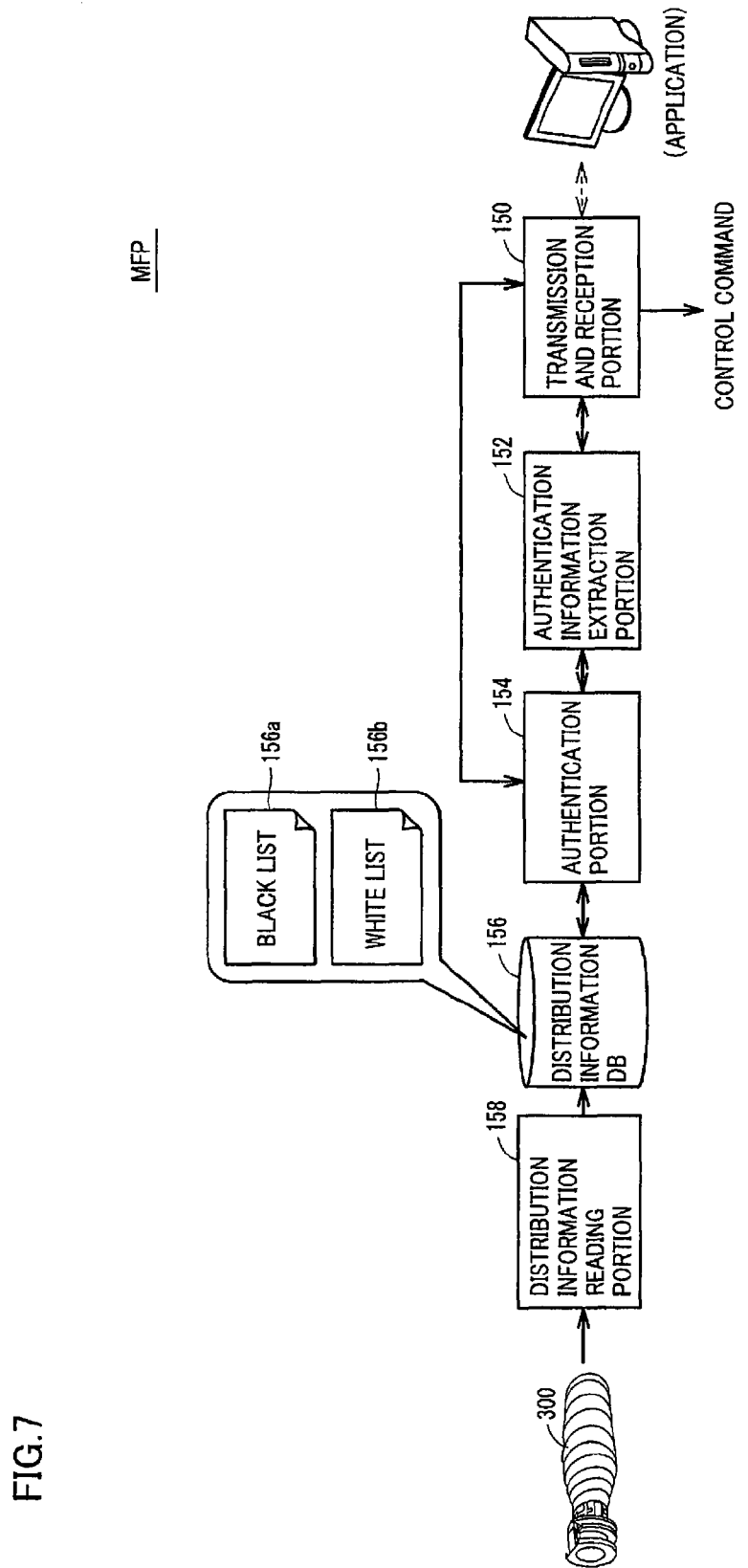
FIG. 7 is a block diagram showing a control structure of the image forming apparatus according to the first embodiment of the present invention.

FIG. 7 is a block diagram showing a control structure of image forming apparatus MFP according to the first embodiment of the present invention. It is noted that the control structure shown in FIG. 7 is mainly implemented by execution of a program stored in advance by CPU 100 (FIG. 4). It is noted that a part or the entirety of functions implemented by the program may be provided by dedicated hardware.

Referring to FIG. 7, image forming apparatus MFP includes, as its control structure, a communication portion, such as a transmission and reception portion 150, an authentication information extraction portion 152, an authentication portion 154, a storage portion, such as a distribution information DB (DataBase) 156, and a reading portion, such as a distribution information reading portion 158.

Transmission and reception portion 150 establishes connection with an application or the like executed on personal computer PC and communicates data. Such connection allows for communicating data to and from a device external of the image forming apparatus MFP, such as a personal computer PC as shown in FIGS. 1 and 2. Initially, receiving a connection request from an application executed on personal computer PC, transmission and reception portion 150 outputs the connection request to authentication information extraction portion 152.

Authentication information extraction portion 152 extracts a license code of the application included in the connection request and outputs the extracted license code to authentication portion 154.

Authentication portion 154 determines whether the extracted license code is valid or not, by comparing the license code with the distribution information stored in distribution information DB 156. Namely, authentication portion 154 receives sender identification information included with a license code of a connection request from the external device, such as PC. The authentication portion 154 compares the sender identification information with reference information stored in distribution information DB 156 and determines whether access in response to the connection request from a sender is permitted or not. In addition, authentication portion 154 returns a result of determination to transmission and reception portion 150. When the result of determination indicates invalid, transmission and reception portion 150 transmits a message indicating prohibition of access to the application from which the connection request was sent. Alternatively, thereafter, transmission and reception portion 150 may provide no response to a request from that sender application. On the other hand, when the result of determination indicates valid, transmission and reception portion 150 establishes connection with the application from which the connection request was sent, and starts data communication. After connection with the application on the other end is established, transmission and reception portion 150 transmits a control command to scanner 112, print engine 114, data reading portion 116 (FIG. 4), and the like, in response to a request transmitted from the application on the other end.

Though FIG. 7 illustrates such a configuration that distribution information DB 156 includes a black list 156a and a white list 156b, only any one of these lists may be used. As described above, authentication portion 154 determines the license code extracted from the transmitted request as invalid when the license code is registered in black list 156a, and determines the license code extracted from the transmitted request as valid when the license code is registered in white list 156b.

Figures 8, 9:
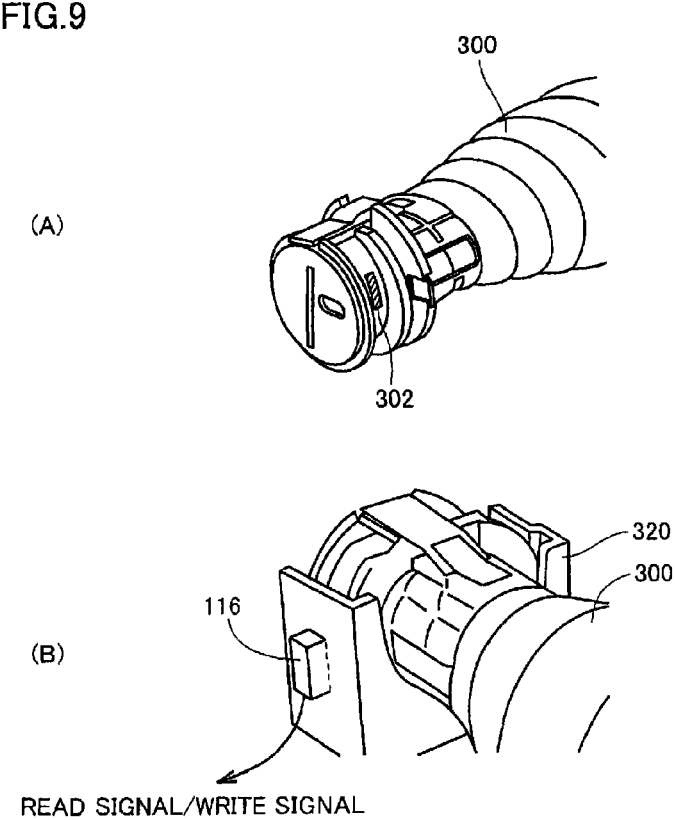
FIG. 8 is a diagram showing a data structure of distribution information according to the first embodiment of the present invention.
FIG. 9 is an external view showing a manner of providing a toner unit according to the first embodiment of the present invention with the distribution information.

FIG. 8 is a diagram showing a data structure of the distribution information according to the first embodiment of the present invention.

Referring to FIG. 8, black list 156a and white list 156b both at least include a list of license codes. In addition, in the example shown in FIG. 8, sender identification information, such as information on an application (a name of an application and version information) and a date of registration of the license code by the manufacturer or the like of image forming apparatus MFP are described in correspondence with each license code and so the sender identification information is included with previously and subsequently mentioned connection requests. It is noted that information on an application and a date of registration are optional items and they do not necessarily have to be described.

Distribution information DB 156 is arranged in a nonvolatile area such as memory 104, and even after power of image forming apparatus MFP is turned off, it retains the distribution information (black list 156a and/or white list 156b).

Referring back to FIG. 7, when consumable product 300 (representatively, a toner unit) is attached to image forming apparatus MFP, distribution information reading portion 158 reads the distribution information provided to consumable product 300 and causes distribution information DB 156 to store the read distribution information. Regarding timing to read the distribution information from consumable product 300, reading once at the time when it is first determined that consumable product 300 is newly attached will suffice. It is noted that the distribution information provided to consumable product 300 is preferably encrypted in order to prevent improper tampering or the like. In this case, distribution information reading portion 158 decrypts the encrypted information by using an encryption key obtained in advance.

(Manner of Providing Distribution Information)

FIG. 9 is an external view showing a manner of providing a toner unit according to the first embodiment of the present invention with the distribution information. FIG. 9(A) shows an exemplary toner unit to which distribution information 302 has been provided, and FIG. 9(B) shows an exemplary state of attachment of the toner unit.

As shown in FIG. 9(A), the toner unit includes an accommodation portion in which toner is accommodated and a constriction portion continuing to the accommodation portion. The constriction portion is provided with an engagement portion so as to be engaged with a mount portion 320 provided on the image forming apparatus MFP side as shown in FIG. 9(B). This engagement portion is formed of two disc-shaped collar portions.

Distribution information 302 may be provided at any position of the toner unit, however, the present embodiment is configured such that data reading portion 116 and mount portion 320 are integrally formed and distribution information 302 can be read while the toner unit is engaged with mount portion 320. Obviously, when the toner unit is engaged with the mount portion 320 of the image forming apparatus MFP, the toner unit has a structure that contributes to the formation of an image by the image forming apparatus MFP. Namely, by way of example, distribution information 302 stored in a storage medium is provided between the two collar portions constituting the engagement portion of the toner unit.

In addition, in providing distribution information 302 to an imaging unit as well, a similar manner can be adopted.

Figure 10:
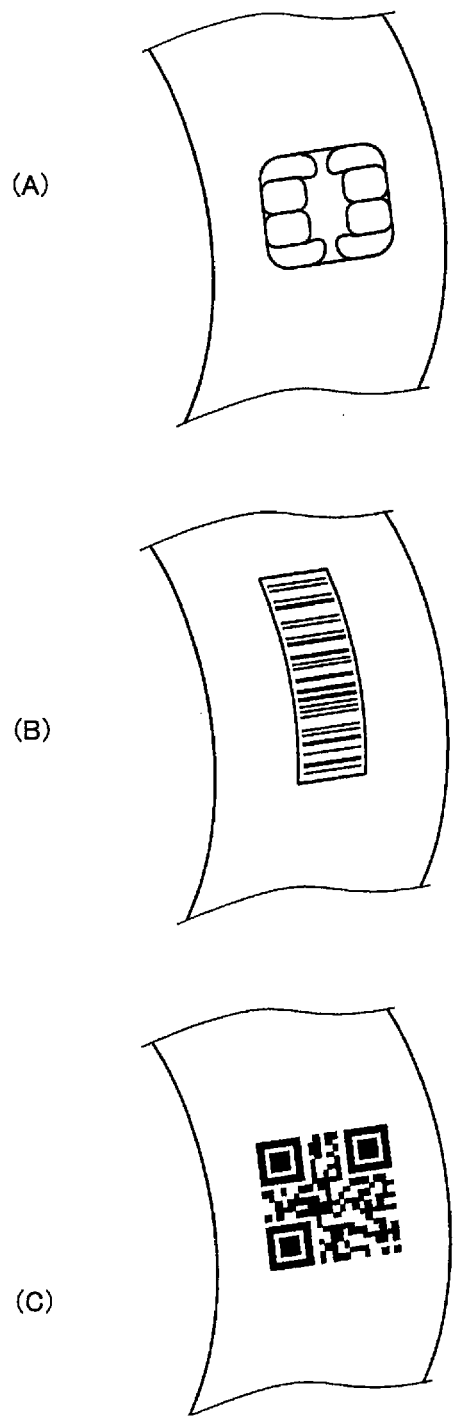
FIG. 10 is an external view showing another manner of providing a consumable product according to the first embodiment of the present invention with the distribution information.

FIG. 10 is an external view showing another manner of providing a consumable product according to the first embodiment of the present invention with distribution information 302.

As described above, though various methods such as electrical, magnetic and optical methods can be adopted as the method of distributing distribution information 302, a storage medium electrically storing distribution information 302 may be distributed to the consumable products, for example, by using an IC (Integrated Circuit) chip or an IC tag as shown in FIG. 10(A). In this case, such a configuration that data reading portion 116 emits a wireless signal and binary data of distribution information 302 is read from such a storage medium in a contact or non-contact manner is adopted.

Alternatively, distribution information 302 may optically be provided as shown in FIGS. 10(B) and 10(C). As a manner of optically providing distribution information 302, FIG. 10(B) shows a method of using a one-dimensional bar code, and FIG. 10(C) shows a method of using a two-dimensional bar code (what is called a QR (Quick Response) code). In this case, such a configuration that light reflected from these bar codes is read by a CCD (Charge Coupled Device) and the like is adopted for data reading portion 116.

Alternatively, embedding distribution information in recording paper itself, wrapping for recording paper, or the like can be adopted as a manner of providing distribution information 302 to the recording paper.

Figure 11:
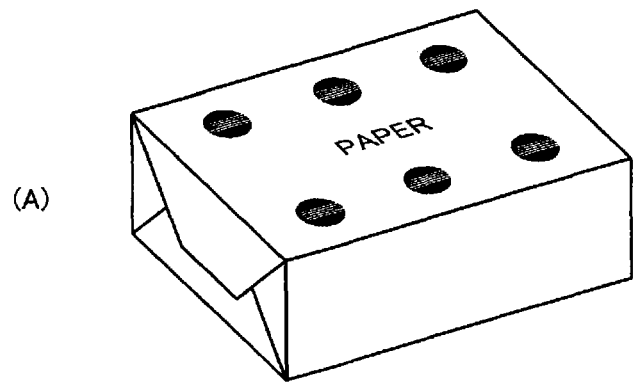
FIG. 11 is a diagram showing yet another manner of providing a consumable product according to the first embodiment of the present invention with the distribution information.
Figure 11:
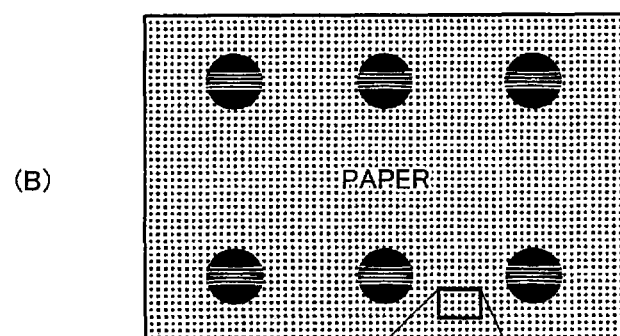
Figure 11:
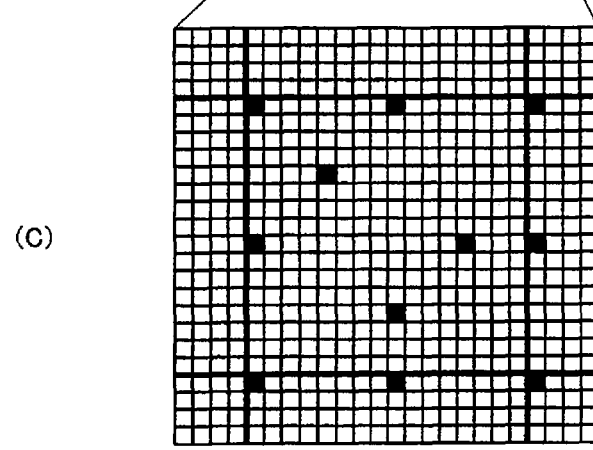

FIG. 11 is a diagram showing yet another manner of providing a consumable product according to the first embodiment of the present invention with distribution information 302.

As shown in FIG. 11(A), the manufacturer (or sales company) of image forming apparatus MFP may manufacture and/or market recording paper suitable for its own image forming apparatus MFP. In such a case, distribution information can be provided also by using a ground pattern or the like in recording paper or wrapping therefor.

Specifically, as shown in FIG. 11(B), a ground pattern that cannot apparently visually be recognized is printed in addition to a logo. As shown in FIG. 11(C), this ground pattern is a pattern drawn in a unit of prescribed dots and information is embedded in accordance with positions of dots constituting each pattern. Though a dedicated data reading portion may be provided as a method of reading the distribution information provided as such a ground pattern, scanner 112 (FIG. 3) mounted on image forming apparatus MFP may be used to read image data, which is then subjected to image processing by CPU 100 (FIG. 4), to thereby generate the distribution information. Namely, when the user purchases new recording paper, updating to new distribution information can be made simply by placing the paper or wrapping therefor in which the ground pattern is embedded on scanner 112 (FIG. 3) and performing an image reading function.

In addition, in a charge-type image forming apparatus MFP using a prepaid card, a method of electrically and/or magnetically storing distribution information in addition to balance information in the prepaid card can also be adopted. In an example where distribution information is distributed using such a prepaid card as a medium, most recent distribution information is preferably written immediately before sales at a prepaid card sales store.

It is noted that distribution information provided to each consumable product preferably additionally includes information on a date of update, an expiration date and the like. By including such information, when a plurality of consumable products are attached to image forming apparatus MFP, authentication processing can be performed with the most recent distribution information alone being valid.

(Processing Procedure)

Figure 12:
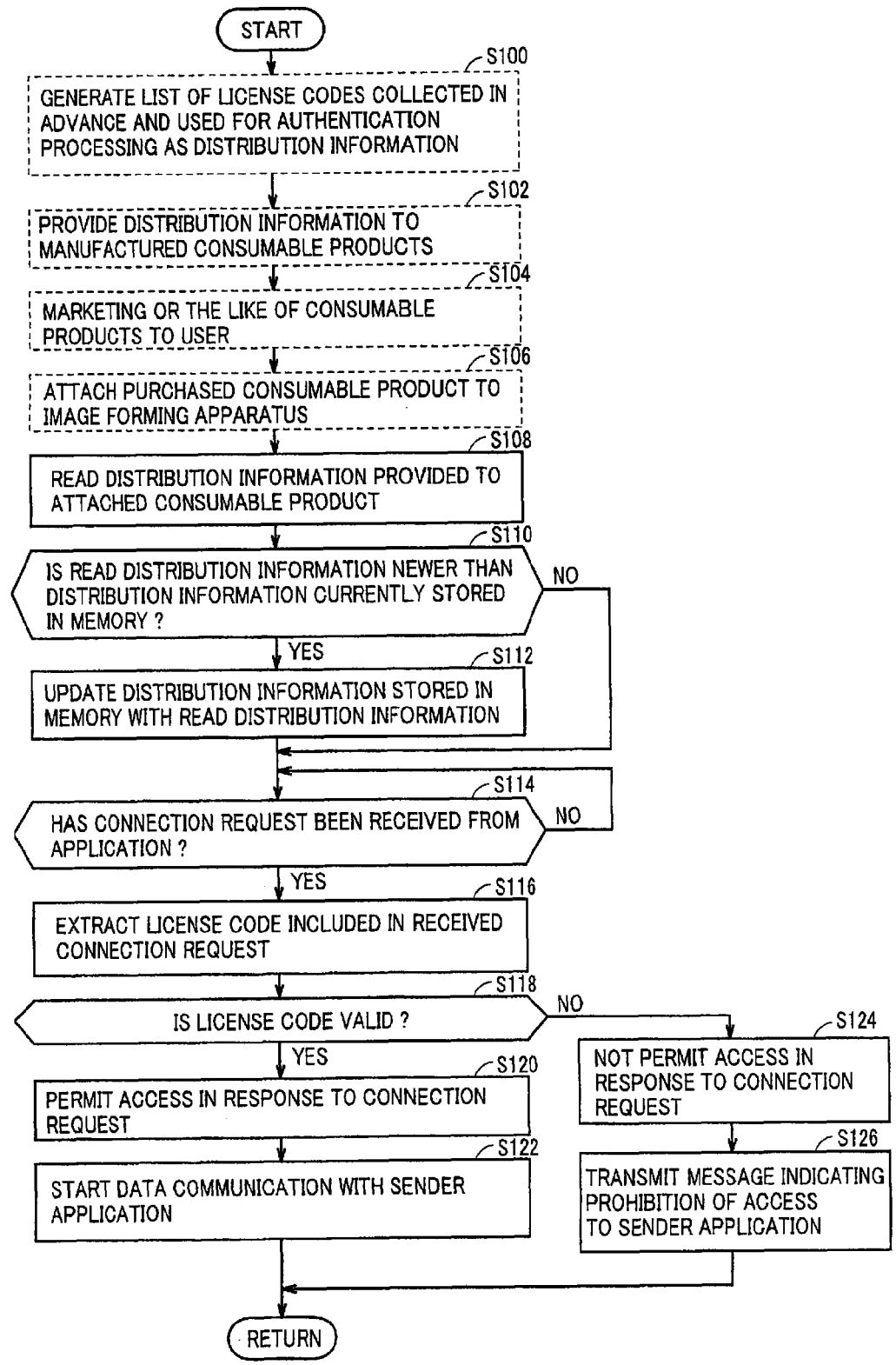
FIG. 12 is a flowchart showing a series of processing procedures in the system according to the first embodiment of the present invention.

FIG. 12 is a flowchart showing a series of processing procedures in the system according to the first embodiment of the present invention.

Referring to FIG. 12, initially, in the manufacturer or the like of image forming apparatus MFP, a list of license codes collected in advance and used for authentication processing is generated as the distribution information (step S100). In using a black list, the manufacturer or the like of image forming apparatus MFP collects license codes corresponding to applications determined with some kind of means as performing an unauthorized operation, and the collected license codes are generated as the distribution information. Alternatively, in using a white list, license codes except for license codes corresponding to applications determined with some kind of means as performing an unauthorized operation among license codes of applications approved by the manufacturer or the like of image forming apparatus MFP are generated as the distribution information. It is noted that, in the distribution information, unauthorized codes are preferably encrypted with a predetermined secret key.

Then, in the manufacturer or the like of image forming apparatus MFP, the distribution information is provided to the manufactured consumable products (step S102). The consumable products are marketed to the user by the manufacturer of image forming apparatus MFP, a sales company, and the like (step S104).

The user attaches the purchased consumable product to image forming apparatus MFP (step S106). Then, CPU 100 of image forming apparatus MFP reads the distribution information provided to the attached consumable product (step S108). It is noted that the read distribution information is decrypted as necessary.

In succession, CPU 100 compares the read distribution information and the distribution information currently stored in memory 104 (distribution information DB 156) with each other and determines whether the read distribution information is newer or not (step S110). When the read distribution information is newer than the distribution information currently stored in memory 104 (distribution information DB 156) (YES in step S110), the distribution information stored in memory 104 (distribution information DB 156) is updated with the read distribution information (step S112). On the other hand, when the read distribution information is not newer than the distribution information currently stored in memory 104 (distribution information DB 156) (NO in step S110), the processing in step S112 is skipped and the process proceeds to step S114.

In step S114, CPU 100 determines whether a connection request was received from an application or not. When the connection request was not received (NO in step S114), the processing in step S114 is repeated.

On the other hand, when the connection request was received (YES in step S114), CPU 100 extracts the license code included in the received connection request (step S116). In addition, CPU 100 compares the extracted license code with the distribution information stored in memory 104 (distribution information DB 156) and determines whether the license code is valid or not (step S118).

When the license code is valid (YES in step S118), CPU 100 permits access in response to the connection request (step S120) and starts data communication with the application from which the connection request was sent (step S122). After data communication ends, the process returns.

On the other hand, when the license code is not valid (NO in step S118), CPU 100 does not permit access in response to the connection request (step S124) and transmits a message indicating prohibition of access to the application from which the connection request was sent (step S126). Then, the process returns.

[Second Embodiment]

In the first embodiment described above, a configuration in which the manufacturer or the like of the image forming apparatus collects unauthorized license codes in advance and provides the license codes to consumable products as distribution information has been exemplified. Meanwhile, in the present embodiment, a configuration in which each image forming apparatus determines whether an application or the like from which access was made is qualified or not, and when the application or the like is not qualified, a license code used by the sender is sensed as an unauthorized license code and collected by the manufacturer or the like of the image forming apparatus will be exemplified.

Since a system configuration according to the present embodiment is similar to that in FIG. 1 above, detailed description will not be repeated.

(Method of Collecting Unauthorized License Codes)

Figure 13:
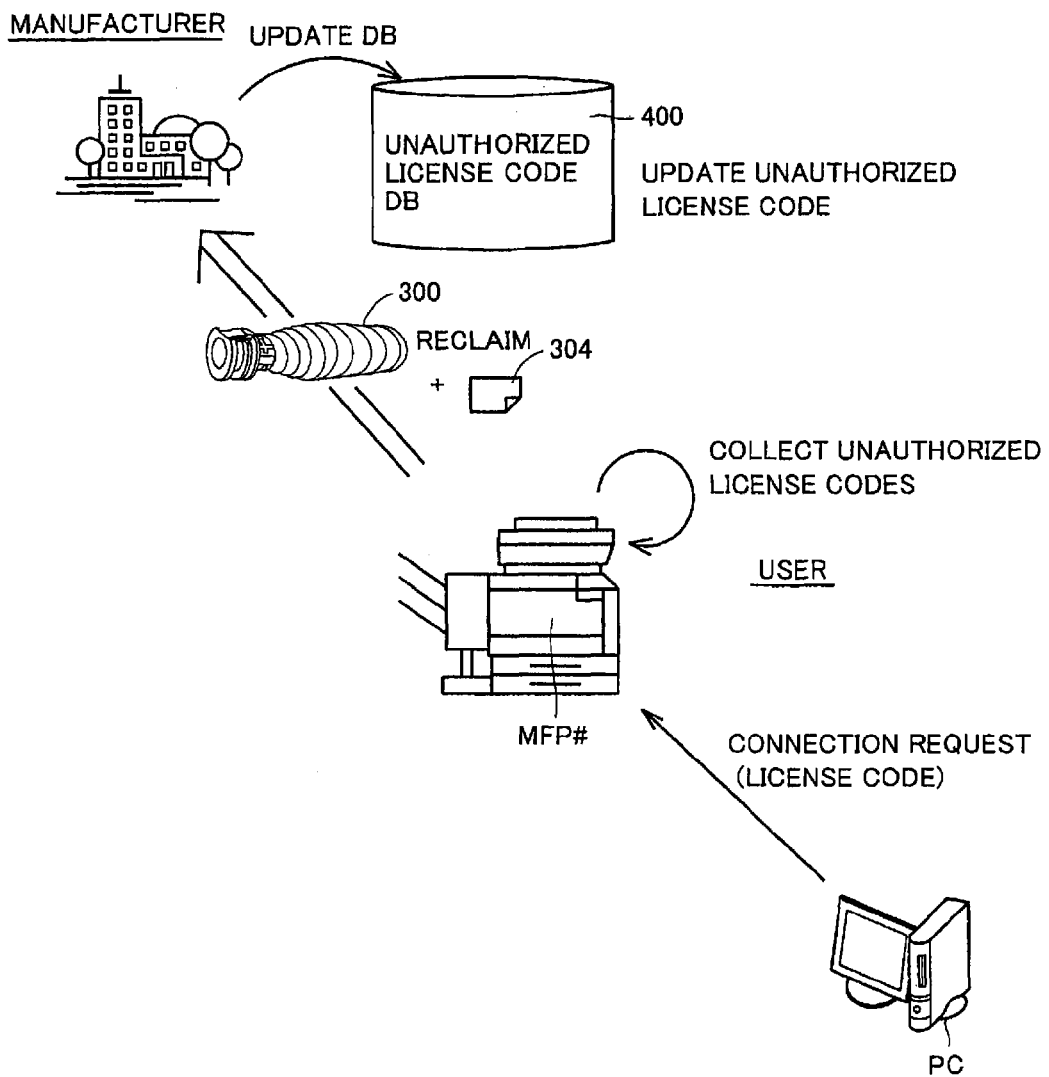
FIG. 13 is a schematic diagram for illustrating a method of collecting unauthorized license codes according to a second embodiment of the present invention.

FIG. 13 is a schematic diagram for illustrating a method of collecting unauthorized license codes according to a second embodiment of the present invention.

Referring to FIG. 13, as in the first embodiment described above, receiving a connection request from an application executed on personal computer PC, an image forming apparatus MFP# determines whether connection is permitted or not based on distribution information stored in advance. Here, even when a license code included in the connection request does not fall under the unauthorized license codes included in the distribution information, that is, when the license code is determined as a valid license code, image forming apparatus MFP# determines whether the application from which access was made is qualified or not. When the image forming apparatus determines that the application is not qualified, the license code used by the application from which access was made is sensed as an unauthorized or highly likely unauthorized license code.

From a viewpoint of effective use of resources, used consumable products 300 are generally reclaimed by the manufacturer or the sales company. In such a case that consumable products 300 are reclaimed, image forming apparatus MFP# provides as unauthorized authentication information 304, the unauthorized or highly likely unauthorized license code collected as described above (hereinafter also simply referred to as the "unauthorized license code") to reclaimed, used consumable products 300.

Then, the manufacturer or the sales company updates an unauthorized license code DB 400 managed by itself, based on unauthorized authentication information 304 provided to reclaimed consumable products 300.

By adopting a method of collecting unauthorized license codes as described above, unauthorized license codes that can locally be generated can more readily be collected.

(Configuration of Image Forming Apparatus)

A configuration of image forming apparatus MFP# for realizing a method of collecting unauthorized license codes as described above will be described hereinafter. In the present embodiment, though a configuration capable of updating contents in distribution information DB with the distribution information provided to the consumable products is exemplified as in the first embodiment described above, such a configuration is not essential for realizing the method of collecting unauthorized license codes according to the present embodiment.

Since the apparatus configuration of image forming apparatus MFP# according to the present embodiment is the same as in FIG. 3, detailed description will not be repeated.

Figure 14:
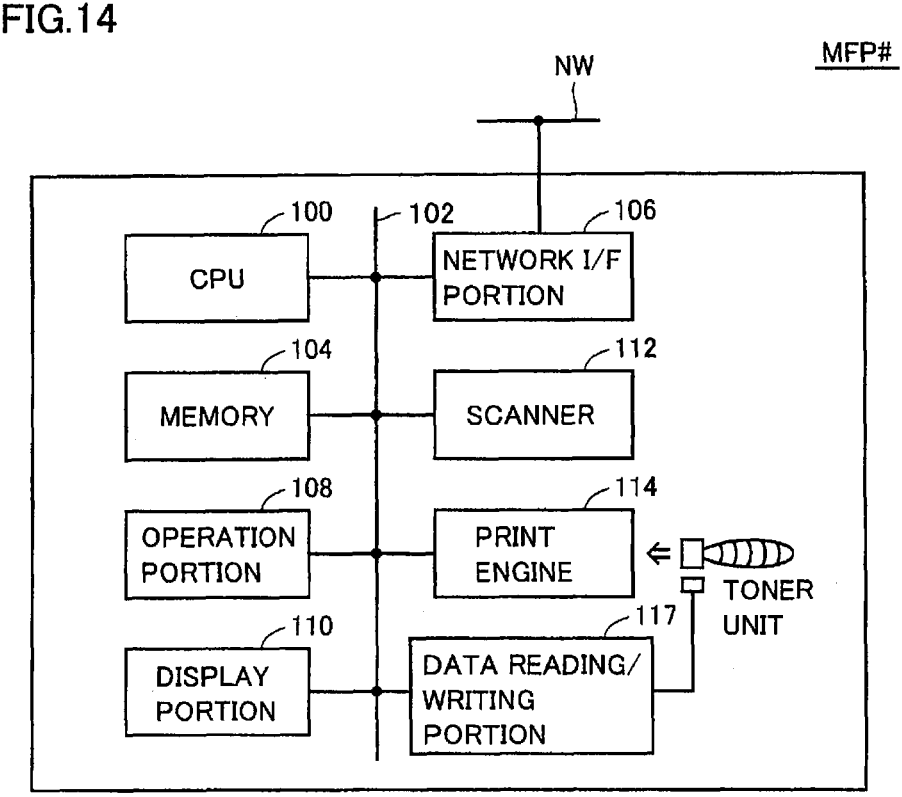
FIG. 14 is a block diagram showing a functional configuration of an image forming apparatus according to the second embodiment of the present invention.

FIG. 14 is a block diagram showing a functional configuration of image forming apparatus MFP# according to the second embodiment of the present invention.

Referring to FIG. 14, image forming apparatus MFP# is provided with a data reading/writing portion 117 instead of data reading portion 116 in the functional configuration of image forming apparatus MFP according to the first embodiment shown in FIG. 4 and image forming apparatus MFP# is otherwise the same as in FIG. 4. Therefore, detailed description will not be repeated.

Data reading/writing portion 117 reads the distribution information provided to the consumable product (representatively, a toner unit) and causes memory 104 to store the read distribution information, as in the case of data reading portion 116. In addition, data reading/writing portion 117 writes unauthorized authentication information including the unauthorized license codes collected in processing which will be described later into the consumable products. The unauthorized authentication information may additionally be written in a storage medium for the distribution information that had been provided at the time of shipment from the manufacturer or the sales company. Alternatively, data reading/writing portion 117 may directly print a (one-dimensional or two-dimensional) bar code indicating unauthorized authentication information on the surface of the consumable products. Namely, a thermosensitive or pressure-sensitive printable medium is provided on the surface of the consumable product, and as data reading/writing portion 117 applies heat or pressure, a pattern such as a bar code indicating unauthorized authentication information or characters can be printed. Further alternatively, a (one-dimensional or two-dimensional) bar code indicating unauthorized authentication information is printed as a label, and the user may attach the printed label to the consumable product to be reclaimed.

Therefore, a configuration necessary as appropriate in accordance with a manner of providing unauthorized authentication information to the consumable products to be reclaimed is adopted for data reading/writing portion 117.

(Control Structure of Image Forming Apparatus)

Figure 15:
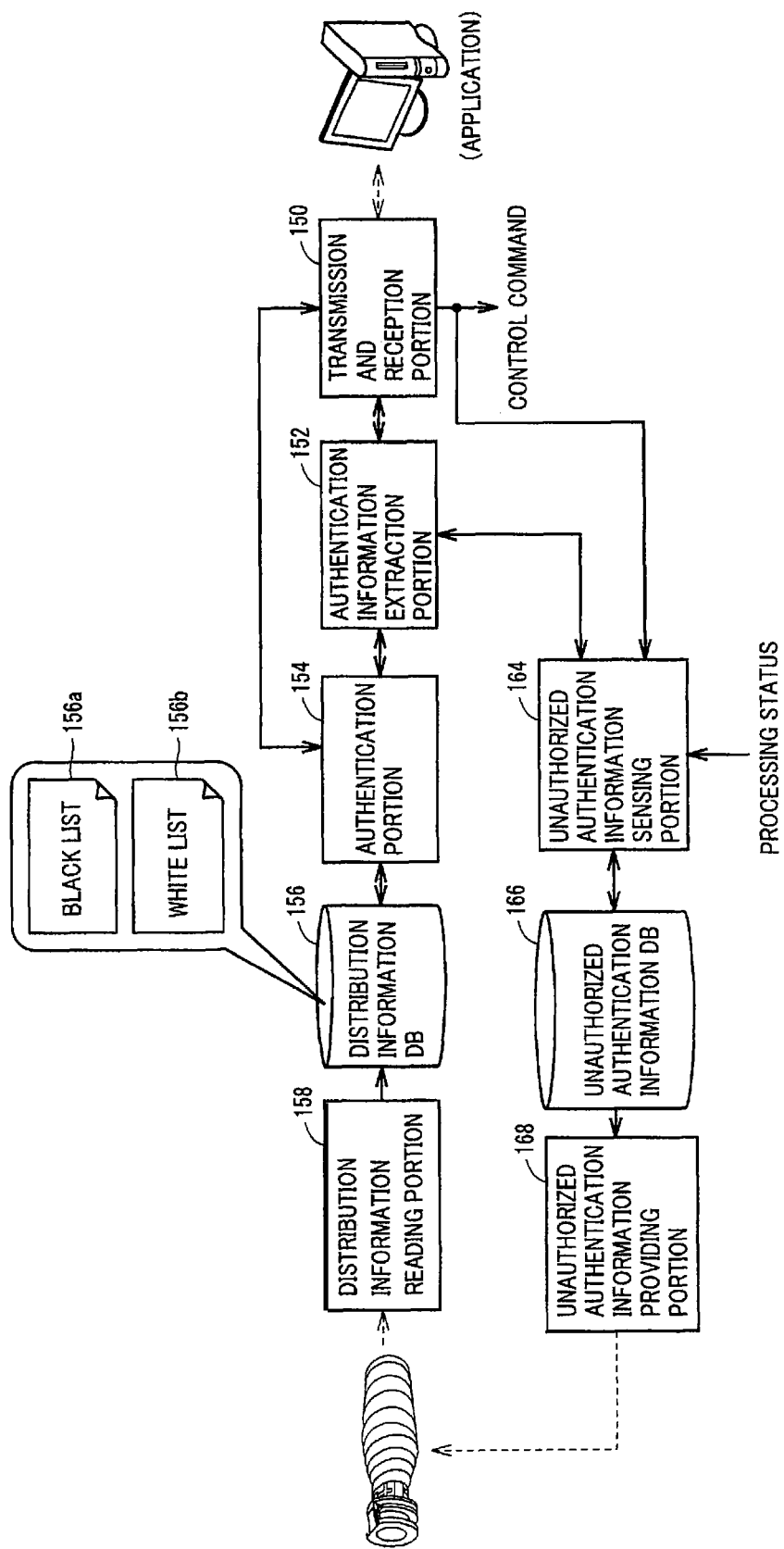
FIG. 15 is a block diagram showing a control structure of the image forming apparatus according to the second embodiment of the present invention.

FIG. 15 is a block diagram showing a control structure of image forming apparatus MFP# according to the second embodiment of the present invention. It is noted that the control structure shown in FIG. 15 is mainly implemented by execution of a program stored in advance by CPU 100 (FIG. 4). It is noted that a part or the entirety of functions implemented by the program may be provided by dedicated hardware.

Referring to FIG. 15, the control structure of image forming apparatus MFP# according to the present embodiment corresponds to a control structure further incorporating an unauthorized authentication information sensing portion 164, an unauthorized authentication information DB 166 and an unauthorized authentication information providing portion 168 in the control structure of image forming apparatus MFP according to the first embodiment shown in FIG. 7. Therefore, detailed description of elements illustrated in FIG. 7 will not be repeated.

After authentication of a connection request from an application executed on personal computer PC was successful, unauthorized authentication information sensing portion 164 determines whether a license code included in the connection request is unauthorized or highly likely unauthorized or not, based on data or the like from the application from which the connection request was sent. Then, when it is determined that the license code is unauthorized or highly likely unauthorized, unauthorized authentication information sensing portion 164 causes unauthorized authentication information DB 166 to successively store the license code as the unauthorized license code. Specific examples of license codes determined as unauthorized or highly likely unauthorized are as follows:

(1) A license code in a case where connection requests including the same license code are transmitted from one application and an application different from the former application;

(2) A license code included in a connection request from an application that transmitted data containing a computer virus or the like; and (3) A license code included in a connection request from an application transmitting data causing frequent errors (abnormal end) in print processing or the like in image forming apparatus MFP#.

Unauthorized authentication information DB 166 is arranged in a non-volatile area such as memory 104, and even after power of image forming apparatus MFP# is turned off, it retains the unauthorized authentication information.

Unauthorized authentication information providing portion 168 provides the unauthorized authentication information accumulated in unauthorized authentication information DB 166 to the consumable products at prescribed timing. Alternatively, unauthorized authentication information providing portion 168 directly prints a (one-dimensional or two-dimensional) bar code indicating the unauthorized authentication information on the surface of consumable products. Examples of timing to provide the unauthorized authentication information include immediately before removal of a toner unit or an imaging unit from image forming apparatus MFP#, each time of sensing of an unauthorized license code by unauthorized authentication information sensing portion 164, each time of sensing of a prescribed number of unauthorized license codes, at certain intervals, and the like.

(Processing Procedure)

FIG. 16 is a flowchart showing a series of processing procedures in a system according to the second embodiment of the present invention. It is noted that, in image forming apparatus MFP#, the distribution information is stored in advance in memory 104 (distribution information DB 156).

Referring to FIG. 16, initially, CPU 100 of image forming apparatus MFP# determines whether a connection request has been received from an application or not (step S200).

When the connection request has not been received (NO in step S200), the processing in step S200 is repeated.

On the other hand, when the connection request has been received (YES in step S200), CPU 100 extracts a license code included in the received connection request (step S202). In addition, CPU 100 compares the extracted license code with the distribution information stored in memory 104 (distribution information DB 156) and determines whether the license code is valid or not (step S204).

When the license code is not valid (NO in step S204), CPU 100 does not permit access in response to the connection request (step S206), CPU 100 transmits a message indicating prohibition of access to the application from which the connection request was sent, and the process returns.

On the other hand, when the license code is valid (YES in step S204), CPU 100 permits access in response to the connection request, and starts data communication with the application from which the connection request was sent (step S208).

In addition, CPU 100 senses an unauthorized license code through processing in subsequent steps S210 to S214.

Namely, in step S210, CPU 100 determines whether or not the license code included in the connection request transmitted by a sender application is the same as the license code that had been included in a connection request transmitted by a different application in the past. When the license code included in the connection request transmitted by the sender application is not the same as the license code of the different application (NO in step S210), the process proceeds to step S212.

In step S212, CPU 100 determines whether or not data transmitted from the sender application contains a computer virus or the like. When the transmitted data does not contain a computer virus or the like (NO in step S212), the process proceeds to step S214.

In step S214, CPU 100 determines whether or not errors (abnormal end) frequently occur in print processing or the like. When errors do not frequently occur in print processing or the like (NO in step S214), data communication is continued. When data communication ends, the process returns.

In contrast, when determination as YES is made in any of steps S210, S212 and S214, CPU 100 determines that the license code used by the current sender application is unauthorized or highly likely unauthorized (step S216). Then, CPU 100 causes memory 104 (unauthorized authentication information DB 166) to store this unauthorized license code.

In addition, CPU 100 determines whether now is the timing to write unauthorized authentication information or not (step S218). When now is the timing to write the unauthorized authentication information (YES in step S218), CPU 100 provides the sensed unauthorized license code to the consumable product (step S220). Then, the process returns. Even when now is not the timing to write the unauthorized authentication information as well (NO in step S218), the process returns.

In the first and second embodiments described above, an example where an image forming apparatus is accessed by an application executed on a personal computer has mainly been illustrated, however, an access request originator is not limited to an application in a narrow sense but similar processing can also be performed in a device itself such as a personal computer or another image forming apparatus, or firmware executed in each device.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Description of the Reference Signs

22 transfer belt; 60, 60Y, 60M, 60C, 60K light-exposure scanning portion; 62, 62Y, 62M, 62C, 62K photoconductor drum; 64, 64Y, 64M, 64C, 64K toner unit; 70, 70Y, 70M, 70C, 70K imaging unit; 102 bus; 104 memory; 106 network interface (I/F) portion; 108 operation portion; 110 display portion; 112 scanner; 114 print engine; 116 data reading portion; 117 data reading/writing portion; 118 paper feed portion; 120 paper ejection apparatus; 122 paper ejection tray; 150 transmission and reception portion; 152 authentication information extraction portion; 154 authentication portion; 156 distribution information DB; 156a black list; 156b white list; 158 distribution information reading portion; 164 unauthorized authentication information sensing portion; 166 unauthorized authentication information DB; 168 unauthorized authentication information providing portion; 202 bus; 204 display; 206 network interface (I/F) portion; 208 input portion; 212 memory; 214 CD-ROM drive; 214a CD-ROM; 216 flexible disk (FD) drive; 216a flexible disk; 252 application; 254 license code; 258 communication process; 300 consumable product; 302 distribution information; 304 unauthorized authentication information; 320 mount portion; 400 unauthorized license code DB; GW gateway; MFP image forming apparatus; NW local network; PC, PC1, PC2, PC3 personal computer; and SRV server.

The invention claimed is:

1. An image forming apparatus, comprising:
   a communication portion for communicating data to a device external of said image forming apparatus and for receiving data from said device;
   a storage portion for storing first reference information including at least one of first identification information indicating prohibition of access from said device to said image forming apparatus and first identification information indicating permission of access from said device to said image forming apparatus;
   an authentication portion for determining, when a connection request including sender identification information is received from said device via said communication portion, whether access from said device to said image forming apparatus in response to said connection request is permitted, by comparing said sender identification information with said first reference information;
   a consumable product separate from said device and having a structure that contributes to formation of an image by said image forming apparatus, wherein said consumable product comprises second reference information; and
   a reading portion for reading said second reference information from said consumable product, to which said second reference information including at least one of second identification information indicating prohibition of access from said device to said image forming apparatus and second identification information indicating permission of access from said device to said image forming apparatus has been provided, and updating said first reference information stored in said storage portion based on said second reference information.

2. The image forming apparatus according to claim 1, wherein said reading portion updates said first reference information stored in said storage portion when said second reference information read from said consumable product is newer than said first reference information stored in said storage portion.

3. The image forming apparatus according to claim 1, wherein said consumable product includes at least one of a toner unit and an imaging unit.

4. The image forming apparatus according to claim 1, wherein said reading portion includes a sensor for reading said second reference information with any method of electrical, magnetic and optical methods when said consumable product is attached to said image forming apparatus.

5. The image forming apparatus according to claim 1, wherein said consumable product is provided with an IC chip or an IC tag storing said second reference information.

6. The image forming apparatus according to claim 1, wherein said second reference information provided to said consumable product is encrypted, and said reading portion decrypts said second reference information read from said consumable product.

7. The image forming apparatus according to claim 1, further comprising:
- a sensing portion for determining whether said sender from which access was permitted is qualified, and sensing said sender identification information included in said connection request from said sender as unauthorized sender identification information when the sender is not qualified; and
- a providing portion for providing said unauthorized sender identification information sensed by said sensing portion to said consumable product.

8. The image forming apparatus according to claim 7, wherein said providing portion writes said unauthorized sender identification information in a storage medium storing said second reference information.

9. The image forming apparatus according to claim 1, wherein said first identification information indicates prohibition of access from said device to said image forming apparatus and said second identification information indicates prohibition of access from said device to said image forming apparatus.

10. The image forming apparatus according to claim 1, wherein said first identification information indicates permission of access from said device to said image forming apparatus and said second identification information indicates permission of access from said device to said image forming apparatus.

11. An access control method in an image forming apparatus capable of communicating data with a device and receiving data from said device, comprising:
- storing first reference information including at least one of 1) first identification information indicating prohibition of access from (a) said device, which is external to said image forming apparatus, to (b) said image forming apparatus, and 2) first identification information indicating permission of access from said device to said image forming apparatus;
- determining, when a connection request including sender identification information is received from said device, whether access from said device to said image forming apparatus in response to said connection request is permitted, by comparing said sender identification information with said first reference information;
- providing a consumable product separate from said device and having a structure that contributes to formation of an image by said image forming apparatus, wherein said consumable product comprises second reference information; and
- reading said second reference information from said consumable product, to which said second reference information including at least one of 1) second identification information indicating prohibition of access from said device to said image forming apparatus; and 2) second identification information indicating permission of access from said external device to said image forming apparatus has been provided, and updating said first reference information stored in a storage portion based on said second reference information.

12. The access control method according to claim 11, wherein said first identification information indicates prohibition of access from said device to said image forming apparatus and said second identification information indicates prohibition of access from said device to said image forming apparatus.

13. The access control method according to claim 11, wherein said first identification information indicates permission of access from said device to said image forming apparatus and said second identification information indicates permission of access from said device to said image forming apparatus.

* * * * *